United States Patent
Kim

(10) Patent No.: US 9,906,710 B2
(45) Date of Patent: Feb. 27, 2018

(54) CAMERA PAN-TILT-ZOOM (PTZ) CONTROL APPARATUS

(71) Applicant: IDIS CO., LTD., Daejeon-si (KR)

(72) Inventor: Chul Kim, Seongnam-si (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 15/366,189

(22) Filed: Dec. 1, 2016

(65) Prior Publication Data

US 2017/0155827 A1    Jun. 1, 2017

(30) Foreign Application Priority Data

Dec. 1, 2015 (KR) ........................ 10-2015-0169908

(51) Int. Cl.
| | | |
|---|---|---|
| *H04N 5/232* | (2006.01) | |
| *H04N 7/18* | (2006.01) | |
| *G06T 11/20* | (2006.01) | |
| *G06F 3/0484* | (2013.01) | |
| *G06F 3/0488* | (2013.01) | |

(52) U.S. Cl.
CPC ....... *H04N 5/23216* (2013.01); *G06T 11/203* (2013.01); *H04N 5/23293* (2013.01); *H04N 5/23296* (2013.01); *G06F 3/0488* (2013.01); *G06F 3/04845* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 6,037,936 A | * | 3/2000 | Ellenby | G01C 17/34 348/211.8 |
| 2015/0172554 A1 | * | 6/2015 | Adachi | H04N 5/23296 348/36 |

FOREIGN PATENT DOCUMENTS

| | | |
|---|---|---|
| KR | 2001-0094610 A | 11/2001 |
| KR | 10-2013-0097286 A | 9/2013 |

* cited by examiner

*Primary Examiner* — Mark T Monk
(74) *Attorney, Agent, or Firm* — NSIP Law

(57) ABSTRACT

Provided is a camera pan-tilt-zoom (PTZ) control technology in which a PTZ control signal input by a user is output as a graphic UI and the user inputs the PTZ control signal while directly monitoring the graphic UI.

A camera PTZ control apparatus includes a UI visualization unit configured to generate a reference mark as a reference for operating the monitored area and generate a graphic output signal which represents a current position mark associated with a current position indicated by the operation unit; a PTZ processor configured to calculate and output a PTZ driving value of a shooting camera based on relative positions of the reference mark and the current position mark; and a camera driving unit configured to output a driving signal for driving a PTZ driving unit of the shooting camera through a communication unit according to the calculated PTZ driving value.

13 Claims, 7 Drawing Sheets

CAMERA PAN-TILT-ZOOM (PTZ) CONTROL APPARATUS

CROSS-REFERENCE TO RELATED APPLICATION(S)

This application claims the benefit under 35 USC § 119(a) of Korean Patent Application No. 10-2015-0169908, filed on Dec. 1, 2015, in the Korean Intellectual Property Office, the entire disclosure of which is incorporated herein by reference for all purposes.

BACKGROUND

1. Field

The following description relates to a user interface for controlling a pan-tilt-zoom (PTZ) camera. The user interface may be preferably applied to a monitoring image technology in the field of security.

2. Description of Related Art

Positioning of a monitored image and a change of an area thereof are basic features frequently used in security image monitoring and mainly use pan-tilt-zoom (PTZ) control. PTZ control is performed generally using an operation unit which is similar to a joystick. A joystick-type operation unit is convenient to use because pan-tilt control is performed instantly in a direction in which a user controls the operation unit, in response to a single operation of the user. However, in some cases, monitoring of images is performed under a situation where a joystick-type operation unit is not provided. Methods for controlling PTZ using an operation unit which is developed as a pointing device, such as a mouse, have been introduced. Such a user interface (UI) through which guide information displayed on a screen is clicked is limited in applying subtle operational intentions of the user and is inconvenient to use.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a technology for providing a user interface (UI) for camera pan-tile-zoom (PTZ) control.

According to the present invention, a PTZ operation signal which is input by a user through a UI is output as a graphic UI, and the user can input the operation signal while directly monitoring the graphic UI, so that camera PTZ control can be more precisely and instantly performed.

In addition, the direction and the speed of PTZ may be input by a single continuous operation, so that more sensitive PTZ control is possible.

Moreover, the direction and moving speed of pan/tilt may be determined by a single operation of the user, and hence convenience of use may be achieved.

Furthermore, since the direction and moving speed of pan/tilt are determined according to a direction and a degree of the operation of the user, the user interface response sensitively to operational intentions of the user.

In one general aspect, there is provided a camera PTZ control apparatus including a UI visualization unit, a PTZ processor, and a camera driving unit. The UI visualization unit may generate a reference mark as a reference for operating the monitored area and generate a graphic output signal which represents a current position mark associated with a current position indicated by an operation unit.

The PTZ processor may calculate and output a PTZ driving value of a shooting camera based on relative positions of the reference mark and the current position mark.

The camera driving unit may output a driving signal for driving a PTZ driving unit of the shooting camera through a communication unit according to the calculated PTZ driving value.

When the reference mark is initially set or reset, the UI visualization unit may generate an animation effect on the reference mark to inform of an event of the initial set or the reset.

The PTZ processor may calculate and output the PTZ driving value such that the monitored area is moved in a direction formed by the reference mark and the current position mark.

The PTZ processor may calculate an amount of movement (PAN and TILT) of a displayed image based on a relative distance between the reference mark and the current position mark.

The PTZ processor may control movement (PAN and TILT) of the monitored area such that the monitored area in which the current position mark is placed is moved to a screen position at which the reference mark is placed, within a predetermined time period.

The PTZ processor may further include a zoom controller configured to calculate and output a zooming magnification value according to a vertical direction formed by the reference mark and the current position mark.

The zoom controller may calculate and output an amount of zooming which is to be processed within a predetermined time period according to a distance between the reference mark and the current position mark.

The zoom controller may set the current position mark above or below the reference mark according to a y-coordinate indicated by the operation unit.

The UI visualization unit may further generate a graphic output signal of a connection line that visualizes a distance between and a direction of the reference mark and the current position mark by connecting the two marks.

The PTZ processor may set the reference mark in response to a first user operation and set the current position mark in response to a second user operation.

The first user operation may be a click and the second user operation is a drag.

The first user operation may be a touch with a pressure of a predetermined level or higher or a touch for a predetermined period or longer and the second user operation may be a touch-drag which is continuously input after the first user operation.

The camera PTZ control apparatus may further include a display controller configured to receive the graphic output signal from the UI visualization unit and display an overlaying image in which a graphic UI is overlapped on a captured image received from the shooting camera.

Other features and aspects will be apparent from the following detailed description, the drawings, and the claims.

Figure 1:
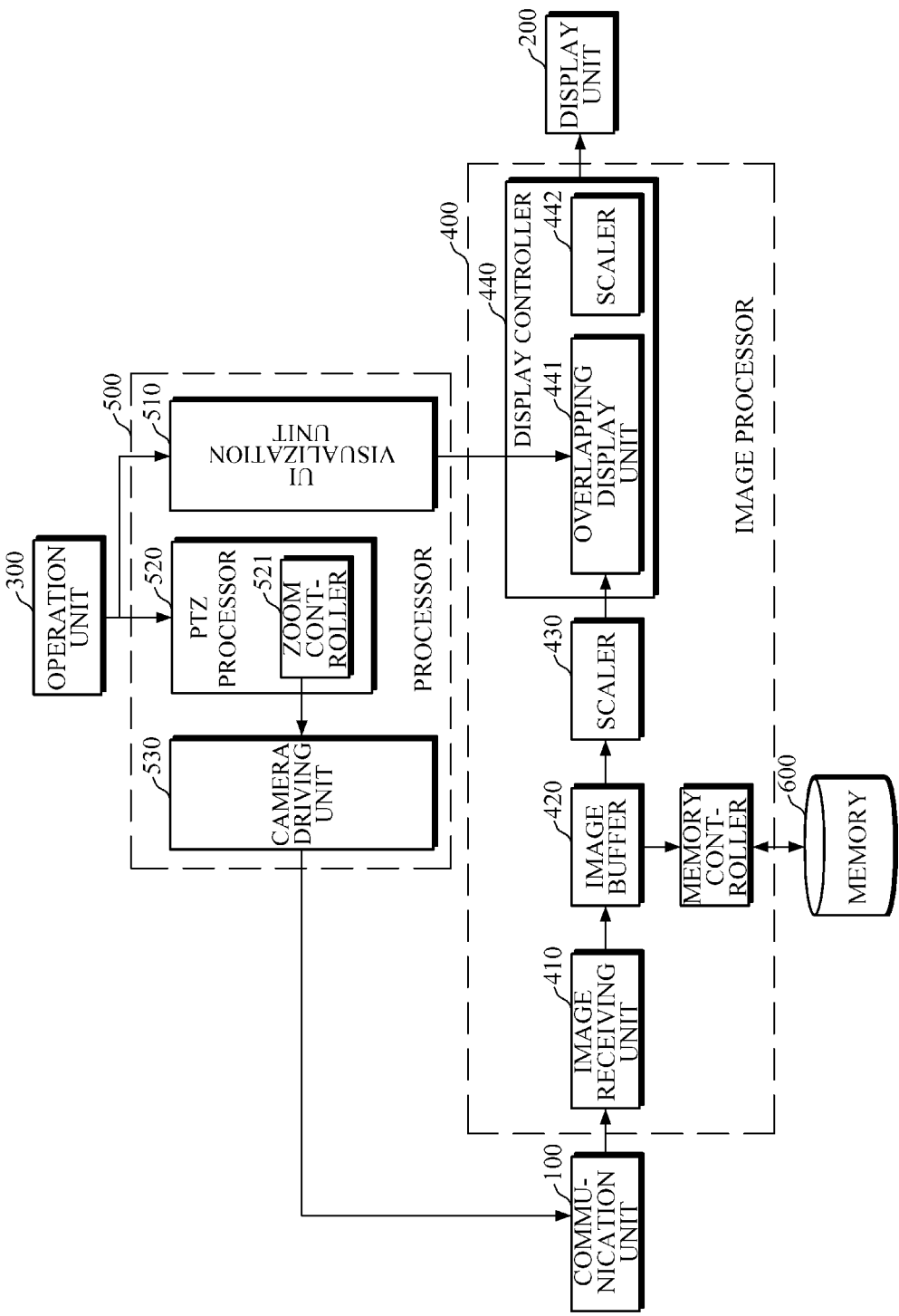
FIG. 1 is a block diagram illustrating a configuration of a camera pan-tilt-zoom (PTZ) control apparatus according to one embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings, components, elements, or parts that are not related to the description are omitted, and the same drawing reference numerals are understood to refer to the same or equivalent elements.

The terms "comprises" and/or "comprising" as used herein will be understood to mean that the list following is non-exhaustive and may or may not include any other additional suitable items, for example one or more further component(s), operation(s), procedure(s), and/or element(s) as appropriate. According to various embodiments of the present disclosure, the term "unit", means, but is not limited to, a software or hardware component, such as a Field Programmable Gate Array (FPGA) or Application Specific Integrated Circuit (ASIC), which performs certain tasks. A "unit" may advantageously be configured to reside on the addressable storage medium and configured to be executed on one or more processors.

Thus, a "unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The components and the functionality provided for the units may be combined into fewer components and units or further separated into additional components and units.

The proposed invention relates to camera pan-tilt-zoom (PTZ) control using a PTZ control apparatus, and may be applicable to a technology for controlling a monitored image by driving a camera.

FIG. 1 is a block diagram illustrating a configuration of a camera PTZ control apparatus according to one embodiment of the present invention. Referring to FIG. 1, the camera PTZ control apparatus includes a communication unit 100, a display unit 200, an operation unit 300, an image processor 400, a processor 500, and a memory 600.

According to one embodiment, the camera PTZ control apparatus controls a shooting camera which is capable of horizontally and vertically rotating and may be a PTZ camera. The camera controls shooting conditions according to a pan (right and left), a tilt (up and down), and a zoom (zoom-in and zoom-out) control signals.

In one embodiment, the communication unit 100 may receive a captured image of a monitored area by communicating with the shooting camera. In another embodiment, the communication unit 100 may control PTZ operations of the camera by transmitting a control signal of the camera PTZ control apparatus to the camera. An image communication channel for transmitting and receiving an image is transmitted and received and a control communication channel for controlling the PTZ operations of the camera may be physically different individual networks, and, for example, the image communication channel may be an analog communication channel using coaxial cables and the control communication channel may be a serial bus, such as 485 bus. In another example, the image communication channel and the control communication channel may be physically the same network, for example, Ethernet communication network, and be logically separated channels.

In one embodiment, the display unit 200 displays the captured image of the monitored area and user control information on a screen. The display unit 200 may include a monitor, a touch screen, or a tablet screen, and may be a device having other types of displays.

In one embodiment, the operation unit receives an operation signal that includes an indication signal for indicating one position on the screen of the display unit 200 from a user. For example, the operation unit may be a mouse, a pen mouse, a joystick, or a direction keys. Alternatively, the display unit 200 may be configured to be physically integrated with the operation unit, as is shown in the case of a touch screen. In one embodiment, the user may input an operation signal for controlling the PTZ operations of the camera through the operation unit while monitoring the captured image and user operation information which are presented through the display unit 200. In one embodiment, the operation signal input by the user through the operation unit may be an indication signal for indicating one position on the screen of the display unit 200, and may be, for example, a signal which indicates an event of user's operation and coordinates of a point at which a mouse point, which is generally used on a computer screen, is located.

In one embodiment, the image processor 400 includes an image receiving unit 410 configured to receive a captured image from the shooting camera through the communication unit 100, an image buffer 420 configured to buffer a captured-image signal, a scaler 430 configured to convert a buffered image signal into an output resolution, and a display controller configured to synthesize a signal received from the processor and the captured image and control the display unit 200 to present an synthesized image.

In one embodiment, the processor may be implemented in a microprocessor, a programmable logic, and the like.

In one embodiment, the memory 600 stores the captured image, which is received by the communication unit 100 from the camera, or setting information of the camera. In one embodiment, the memory 600 may be a flash memory that has low power consumption and can retain data even without a battery. In another embodiment, the memory 600 may be a semiconductor memory which buffers the image signal received from the shooting camera and stores the image signal on a frame-by-frame basis, and may be implemented as a medium, for example, a random access memory (RAM), such as a dynamic RAM (DRAM), Rambus DRAM, a synchronous DRAM, and a static RAM. The image processor 400 may access the memory and select one of the stored frames and read the image of the indicated specific area from the frame data. By accessing part of an address of the frame memory area, it is possible to extract image information of a part of the area.

In one embodiment, the processor executes a program that includes program code blocks in which a user interface (UI) visualization unit 510, the PTZ processor 520, and a camera driving unit 530 are implemented.

In one embodiment, the UI visualization unit 510 may generate a graphic signal associated with the operation signal for position information input by the user through the operation unit 300 and output the graphic signal to the display unit 200 through the image processor 400, so that the user can graphically monitor an operation signal upon inputting the operation signal.

Figure 2:
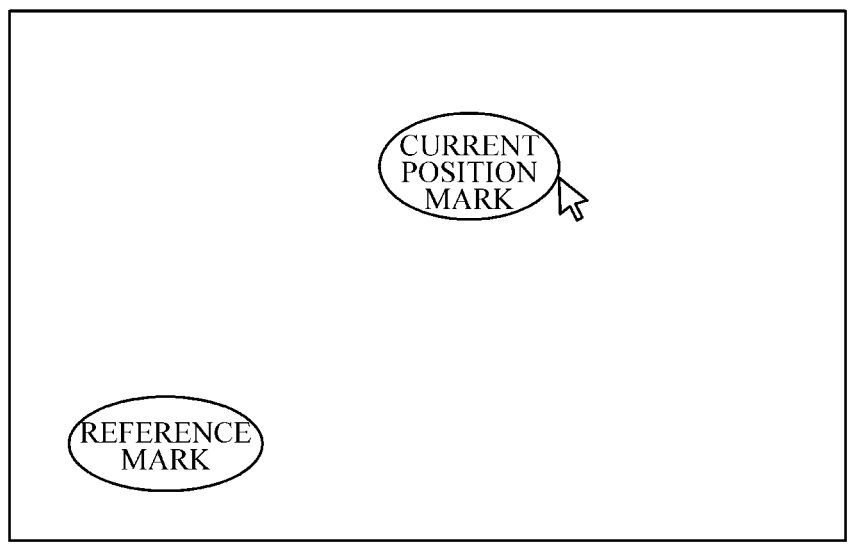
FIG. 2 is a diagram illustrating a reference mark and a current position mark according to one embodiment of the present invention.

In one aspect, the UI visualization unit 510 generates a reference mark as a reference for operating the monitored area, and a graphic output signal for presenting a current position mark associated with the current position indicated by the operation unit 300. FIG. 2 is a diagram illustrating an embodiment of the reference mark and the current position mark which are displayed on the screen. In one embodiment, when the user inputs an operation signal through the operation unit 300 in order to indicate one position on the screen of the display unit 200 as a reference point, the UI visualization unit 510 generates a graphic output signal to display the reference mark on the corresponding position. The graphic output signal for the generated reference mark is graphically output on one position of the image indicated on the display unit 200 by the user through the image processor 400. In one embodiment, the current position mark is a graphic signal that indicates a position of the operation signal which is input by the user through the operation unit 300 after the reference mark is set.

In one embodiment, the PTZ processor calculates a PTZ driving value of the shooting camera based on a relative position between the reference mark and the current position mark. In one embodiment, according to the relative position of the current position mark with respect to the reference mark, it is determined whether pan (left and right), tilt (up and down), or zoom-in/out of the shooting camera is performed. In one embodiment, a driving speed for pan, tilt and zoom-in/out of the shooting camera is determined according to a distance between the reference mark and the current position mark. For example, when the current position mark is close to the reference mark, pan, tilt, or zoom-in/out is performed at a low speed, and when the current position mark becomes farther away from the reference mark, a driving speed for pan, tilt and zoom-in/out increases in proportion to the increasing distance.

In an additional aspect, when the reference mark is initially set or reset, the UI visualization unit 510 generates an animation effect on the reference mark to inform of set or reset. As described above, when the user sets the reference point at one position on the screen of the display unit 200 through the operation unit 300, the UI visualization unit 510 presents the reference mark on the pertinent position in the display unit 200, in which the UI visualization unit 510 generates the animation effects when the reference mark is displayed, so that an event of setting the reference mark is easily visually recognized. In addition, when the reference mark is reset, a PTZ driving value is re-calculated based on a relative position of the current position mark with reference to the position of the reference mark, and hence the event of resetting the reference mark needs to be clearly informed to the user. Thus, the animation effect is generated when the reference mark is displayed, thereby informing of the setting or resetting of the reference mark.

Figure 4:
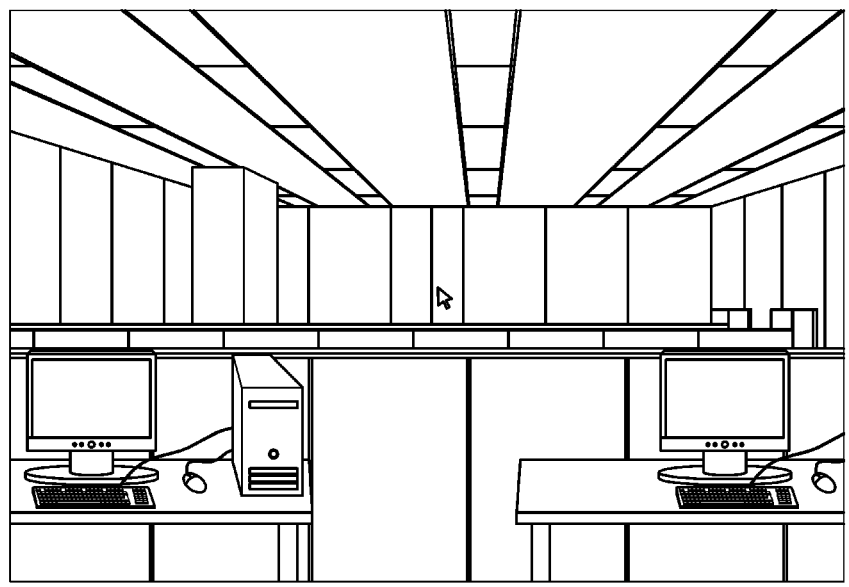
FIG. 4 is an illustration showing a monitored image captured by a camera in accordance with one embodiment of the present invention.
Figure 5:
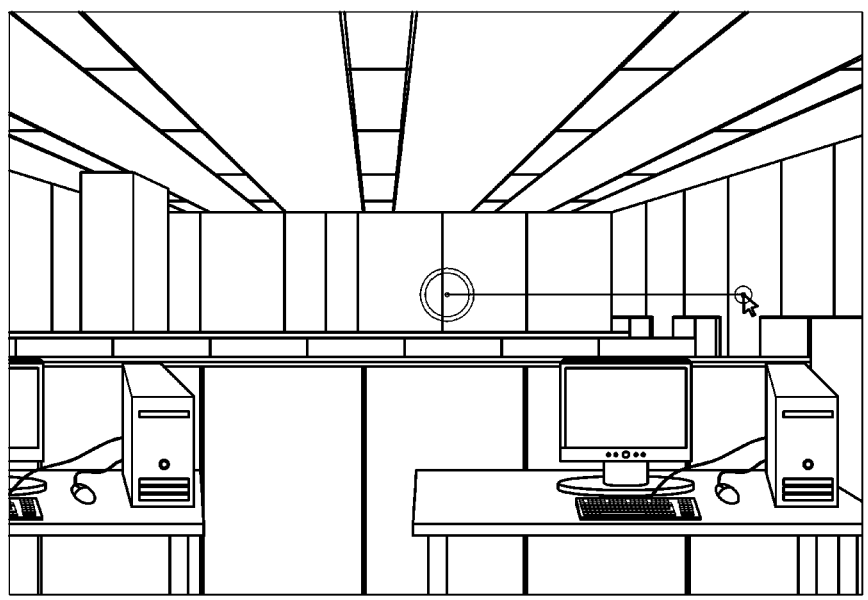
FIG. 5 is an illustration showing an embodiment in which pan-control is performed on the monitored image shown in FIG. 4 and an operation signal for pan control is presented as a graphic user interface (UI).

In one specified aspect, the PTZ processor calculates a PTZ driving value such that the monitored area is moved in a direction formed by the reference mark and the current position mark, and the PTZ processor outputs the calculated value. In one embodiment, if the current position mark is positioned 45 degrees to the upper right of the reference mark, as shown in FIG. 2, the PTZ processor calculates the PTZ driving value such that the shooting camera is pan-tilted 45 degrees to the upper right. In one specified embodiment, the PTZ processor calculates a PTZ value that allows a specific monitored area in which the current position mark is placed to be displayed on a screen area in which the reference mark is located. For example, when the current position mark is positioned in the right side of the reference mark, the PTZ processor calculates a PTZ value such that shooting camera is panned toward the right and accordingly, the monitored area that is currently displayed on the right side of the screen is to be displayed on the screen area where the reference mark was placed. FIG. 5 is an illustration showing a displayed monitored area which is moved from the position as shown in FIG. 4 to the right when the current position mark is moved to the right side of the reference mark. In another example, when the current position mark is positioned below the reference mark, the PTZ processor calculates a driving value such that the shooting camera is tilted downward and hence the monitored area which is currently displayed on a lower side of the screen is moved upward and to be displayed on the screen area where the reference mark was placed. In still another example, when the current position mark is positioned diagonally to the reference mark, the PTZ processor calculates a driving value such that the shooting camera is pan-tilted in the same diagonal direction and accordingly the monitored area which is currently displayed in the diagonal direction to the reference mark is to be displayed at the screen position where the reference mark was placed. The position of the reference mark is set according to the user's operation, and the reference mark may be placed at the center or an arbitrary position on the screen.

In one aspect, the camera driving unit 530 outputs a driving signal to drive a PTZ driving unit of the shooting camera through the communication unit 100 according to the calculated PTZ driving value. The shooting camera drives the PTZ driving unit according to the PTZ driving signal received through the communication unit 100, thereby allowing the user to capture the desired monitored area.

In one embodiment, when the PTZ driving signal is delivered to the shooting camera through the communication unit 100, the PTZ driving unit of the shooting camera operates according to the PTZ driving signal, so that PTZ operations of the shooting camera is performed in a direction formed by the reference mark and the current position mark.

Accordingly, the monitored area is moved along a direction formed by the reference mark and the current position mark and hence images of the monitored area to be output are captured along the same direction as the movement of the monitored area.

In one aspect, the PTZ processor calculates an amount of movement (PAN, TILT) of the displayed image on the screen based on a relative distance between the current position mark and the reference mark. In one embodiment, as the current position mark is positioned farther from the reference mark, the monitored area is moved more and the amount of movement of the displayed image on the screen increases. On the contrary, as the current position mark is positioned closer to the reference mark, the amount of movement of the monitored area decreases and the amount of movement of the displayed image on the screen also decreases. In one embodiment, while the reference mark and the current position mark keep a constant distance, the amount of movement of the displayed image which corresponds to the constant distance is calculated and pan/tilt of the shooting camera is continuously processed according to the calculated amount of movement of the displayed image. For example, if the reference mark and the current position mark keep a constant distance according to the user's operation while a displayed area is moving on the screen, the pan/tilt can be continuously driven.

In one specified embodiment, the PTZ processor may control the movement (PAN and TILT) of the monitored area such that the monitored area in which the current position mark is located can be placed at a position on the screen at which the reference mark is placed. As described above, the PTZ processor controls the pan/tilt of the shooting camera such that the monitored area which is currently displayed in a manner that the current position mark is centered is moved into the displayed area on which the reference mark is centered. At this time, the PTZ processor controls the pan/tilt of the shooting camera to move for the same predesignated time period, regardless of the distance between the reference mark and the current position mark, so that the controlling speed of the pan/tilt of the shooting camera becomes faster as the distance between the reference mark and the current position mark is greater and the controlling speed of the pan/tilt becomes slower as the distance between the reference mark and the current position mark is smaller. That is, because when the reference mark is far from the current position mark, the amount of movement of the displayed image to be processed for the same time period is greater than when the reference mark is close to the current position mark, the control speed of the pan/tilt of the shooting camera increases. On the contrary, when the reference mark is close to the current position mark, the amount of movement on the screen to be processed for the same time period is small, and hence the control speed of the pan/tilt decreases.

Figure 6:
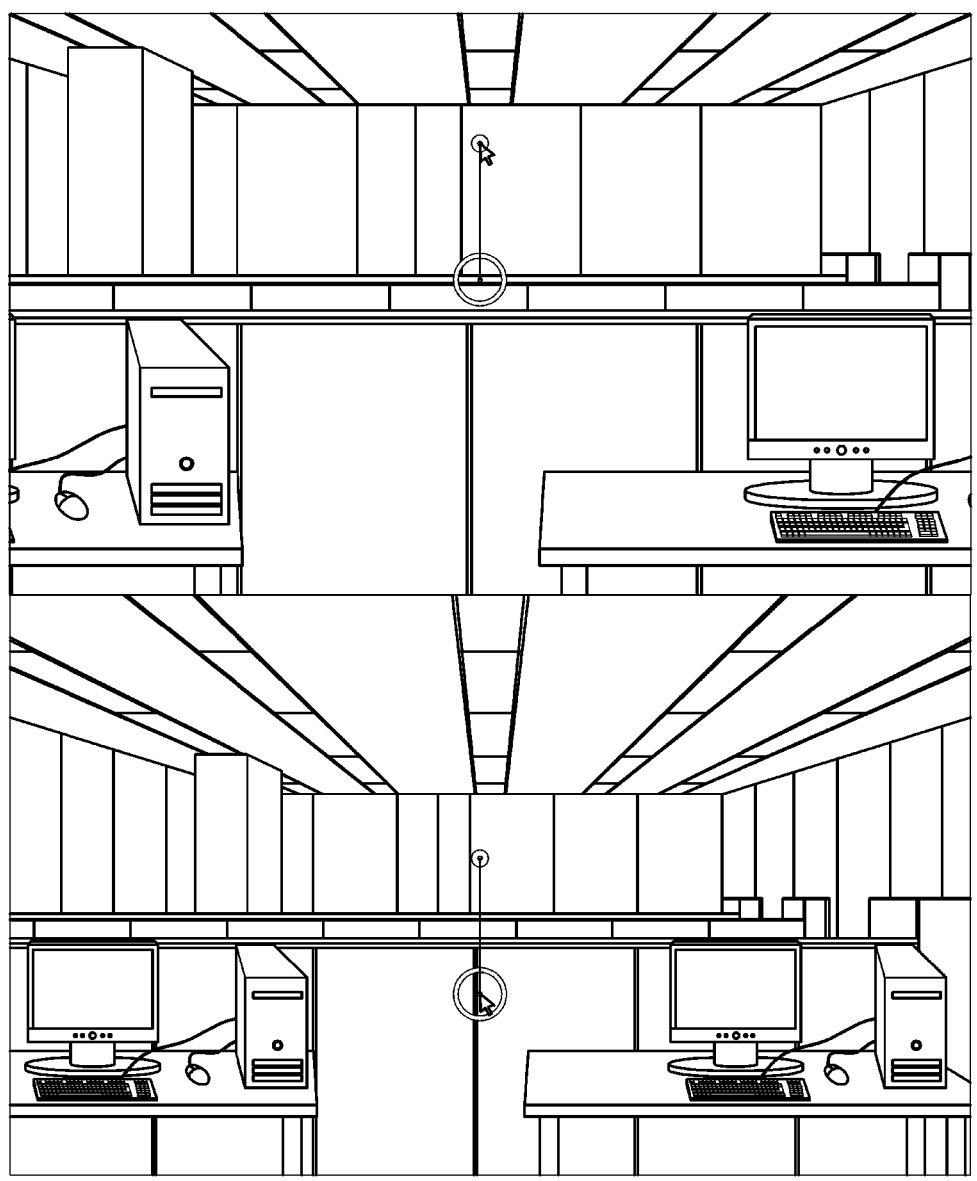
FIG. 6 is an illustration showing the comparison between a zoomed-in monitored image and a zoomed-out monitored image in accordance with one embodiment of the present invention.

In still another aspect, the PTZ processor further includes a zoom controller 521 configured to calculate and output a zooming magnification value according to a vertical direction formed by the reference mark and the current position mark. In one embodiment, the a zoom control for zooming-in or zooming-out the monitored area is conducted based only on a vertical direction formed by the current point mark and the reference mark, other than a horizontal direction formed by the two marks. As will be described below, the signal for controlling the zoom controller 521 is generated based only on the vertical direction formed by the reference mark and the current position mark. In one specified embodiment, when the current position mark is positioned above the reference mark, the zoom controller 521 calculates a zooming magnification value (e.g., 2 times or 3 times) such that the monitored area is zoomed in. When the current position mark is positioned below the reference mark, the zoom controller 521 calculates a zooming magnification value (e.g., 0.5 times or 0.3 times) such that the monitored area is zoomed out. FIG. 6 is an illustration showing displayed monitored areas when the monitored area displayed as shown in FIG. 4 is zoomed in and zoomed out. An upper diagram of FIG. 6 shows that the current position mark is positioned above the reference mark and the lower diagram shows that the current position mark is positioned below the reference mark.

In one aspect, the zoom controller 521 calculates and outputs an amount of zooming which is to be processed within a designated time period according to a distance between the reference mark and the current position mark. The speed of zooming is controlled by varying the amount of zooming within a designated time period according to the distance between the reference mark and the current position mark, just as in the case where the driving speed for pan/tilt of the shooting camera alters as the amount of movement of the displayed image within a designated time period varies according to the distance between the reference mark and the current position mark. For example, the greater the vertical distance between the reference mark and the current position mark is, the more quickly zooming is processed, and the shorter the vertical distance between the reference mark and the current position mark is, the more slowly zooming is processed. Therefore, as the current position mark is positioned further above the reference mark, the monitored area is zoomed in faster, and as the current position mark is positioned further below the reference mark, the monitored area is zoomed out faster. In another example, if the current position mark is moved further above the reference mark and moved back close to the reference mark, the monitored area is zoomed in fast and then the speed of zooming in becomes slower corresponding to the decrease in the distance between the current position mark and the reference mark. In another example, if the vertical distance between the current position mark and the reference mark is constant, the monitored area is zoomed in or zoomed out at a constant speed.

Figure 7:
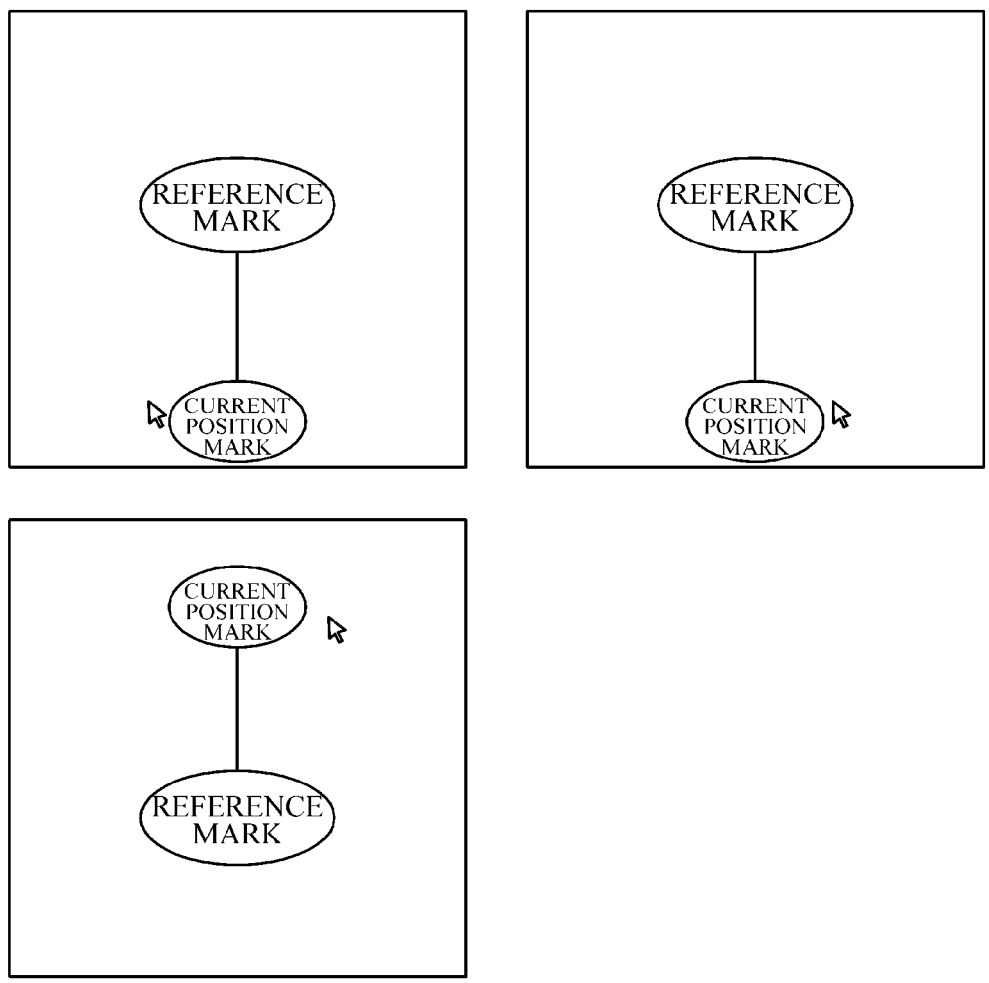
FIG. 7 is a diagram illustrating positioning of the current position mark above and below the reference mark by a zoom controller.

In one aspect, the zoom controller 521 sets the current position mark to be above or below the reference mark according to a y-coordinate indicated by the operation unit 300. When the zoom-control is initiated, as shown in FIG. 7, the zoom controller 521 sets the current position mark whose x-coordinate value is identical to that of the reference mark by applying a y-coordinate value indicated by an operation signal received from the operation unit 300 which specifies one point on the screen. In this case, as shown in FIG. 7, a positional discrepancy between an input pointer that represents the operation signal received from the operation unit 300 and the current position mark that represents a zoom control operation signal may occur.

Figure 3:
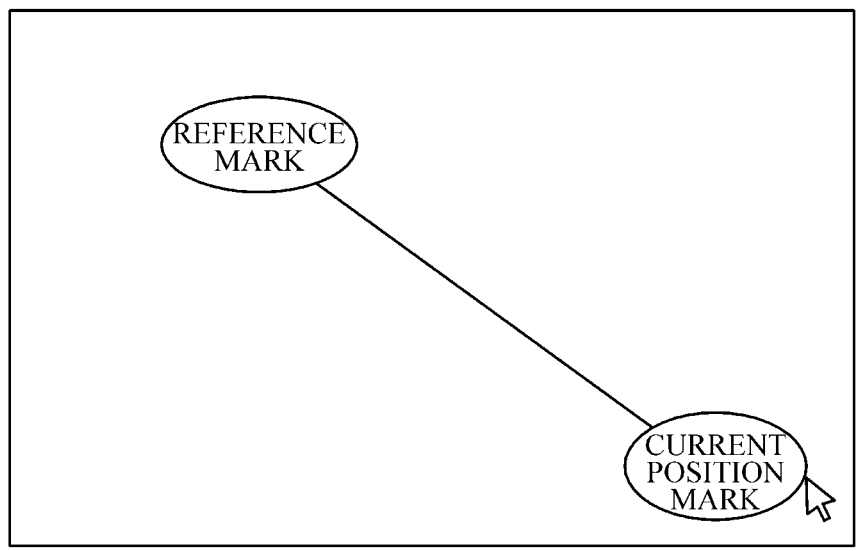
FIG. 3 is a diagram illustrating a connection line between the reference mark and the current position mark according to one embodiment of the present invention.

In one additional aspect, the UI visualization unit 510 may further generate and output a graphic output signal of a connection line that visualizes the distance between and the direction of the reference mark and the current position mark by connecting the two marks. FIGS. 3 and 7 illustrate a connection line that connects the reference mark and the current position mark is shown. The direction formed by the reference mark and the current position mark and the distance therebetween correspond to the operation signal for PTZ control, and thus when the user monitors and controls the direction and distance by visualizing the direction and distance, it is possible to more instantly and precisely perform PTZ control.

According to one aspect, the PTZ processor 520 sets the reference mark in response to a first user operation and sets the current position mark in response to a second user operation. In one embodiment, the first and second user operations may be different operations for controlling the operation unit 300. In one embodiment, the second user operation may be performed after the first user operation is performed. Hence, the current position mark may be set after the reference mark is set. In one embodiment, the second user operation may be performed continuously immediately after the first user operation. Thus, the current position mark may be set in response to the second user operation that is continuously input immediately after the reference mark is set in response to the first user operation.

In one specified aspect, the first user operation may be a click, and the second user operation may be a drag. For example, when the user selects one point on the screen by a click operation through the operation unit 300, the PTZ processor 520 sets the reference mark on the selected point in response to the click operation. After the reference mark is set, if the user uses the operation unit 300 and inputs a drag to move away from the reference mark, the PTZ processor 520 sets the current position mark near the reference mark in response to the drag operation. The display unit 200 shows that the current position mark is responsively dragged while the drag operation is performed.

In another aspect, the first user operation may be a touch on the screen with a pressure of a predetermined level or higher or a touch for a predetermined period or longer, and the second user operation may be a touch-drag which is input continuously after the first user operation is input. In one embodiment, in the case where the display unit 200 is a touchscreen, an operation unit 300 is not separately provided and the display unit 200 may include the operation unit 300 and receive an operation signal. For example, the user may touch the touchscreen to specify one point on the captured image as the position of the reference mark while monitoring the captured image on the touchscreen. In this case, the touchscreen sets the reference mark by recognizing only a specific touch with a pressure of a predetermined level or higher or a specific touch for a predetermined period or longer as a first operation. In one embodiment, after the specific touch that can allow for setting the reference mark is input, the user may input a touch-drag to move away from the reference mark. In this case, the PTZ processor 520 sets the current position mark according to the touch-drag, and the display unit 200 shows the current position mark which is moving in response to the touch-drag.

In one aspect, the image processor 400 in the camera PTZ control apparatus includes a display controller 440 configured to receive the graphic output signal from the UI visualization unit 510, generate an overlaying image in which the graphic UI is overlapped on the captured image from the shooting camera, and output the overlaying image. In one embodiment, the display controller may output the captured image of the camera, which is received by the image receiving unit 410, to the display unit 200 to reproduce the image. In another embodiment, the display controller may control the display unit 200 to output the graphic UI according to the graphic output signal generated by the UI visualization unit 510, so that the operation signal which the user inputs through the operation unit 300 can be visually presented through the display unit 200. In one specified embodiment, the display controller includes an overlapping display. The overlapping display unit 441 controls the display unit 200 to present the graphic output signal, which is generated by the UI visualization unit 510, to be overlapped on the captured image of the camera, which is received from the image receiving unit 410. For example, when one position on the captured image is set as the position of the reference mark, the overlapping display unit 441 presents the reference mark at the set position on the captured image. When, after the reference mark is set, the monitored area is moved by performing PTZ control on the camera through a drag input, the overlapping display unit 441 outputs a captured image is that shows the monitored area being moved and outputs the drag input as the motion of the current position mark on the output image, thereby reproducing an overlaying image.

The PTZ driving unit of the camera which may be located in proximity of the camera and controls the PTZ of the camera in response to a received driving signal in accordance with the present invention may be a physical driving unit or a digital driving unit. For example the PTZ driving unit may be a PTZ actuator which includes a two-axis actuator and a zooming lens. In another example, the PTZ driving unit may be a digital PTZ which selects a displayed area from an image captured by a high-resolution image sensor or a fisheye lens, in response to a digital PTZ driving signal. In still another example, the PTZ driving unit may be a digital PTZ which extracts an area that is selected from a synthesized image, such as a panoramic image or an around-view image, in which multiple images captured by a number of cameras are stitched together, in response to a PTZ driving signal. In yet another example, the PTZ driving unit may be any logically feasible combinations of the PTZ driving units described above. For example, physical PTZ driving may be performed to a certain limit, and digital PTZ process may be performed in response to the physical PTZ limit or a driving instruction that requires a precise resolution beyond the physical PTZ limit.

According to the above embodiments of the present invention, it is possible to visually present user operation information for controlling camera PTZ on a screen.

In addition, it is possible to display the user operation information for controlling camera PTZ on the screen such that the user operation information is overlapped on an image of a monitored area captured by a camera whose PTZ is processed according to the user operation information.

Moreover, it is possible to drive camera PTZ according to a direction of a drag input through an operation unit.

Furthermore, it is possible to change a driving speed of camera PTZ according to a length of drag input through the operation unit.

The user is allowed to accurately and immediately input his/her instruction for PTZ control with a simple gesture.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A camera pan-tilt-zoom (PTZ) control apparatus comprising:
   a display unit configured to display a captured image of a monitored area and user operation information on a screen;

an operation unit configured to receive an operation signal which comprises an indication signal for indicating one position on the screen of the display unit from a user;
a processor; and
a memory,
wherein the processor executes a program which comprises commands comprising:
a user interface (UI) visualization unit configured to generate a reference mark as a reference for operating the monitored area and generate a graphic output signal which represents a current position mark associated with a current position indicated by the operation unit;
a PTZ processor configured to calculate and output a PTZ driving value of a shooting camera based on relative positions of the reference mark and the current position mark; and
a camera driving unit configured to output a driving signal for driving a PTZ driving unit of the shooting camera through a communication unit according to the calculated PTZ driving value.

2. The camera PTZ control apparatus of claim 1, wherein when the reference mark is initially set or reset, the UI visualization unit generates an animation effect on the reference mark to inform of an event of the initial set or the reset.

3. The camera PTZ control apparatus of claim 1, wherein the PTZ processor calculates and outputs the PTZ driving value such that the monitored area is moved in a direction formed by the reference mark and the current position mark.

4. The camera PTZ control apparatus of claim 1, wherein the PTZ processor calculates an amount of movement (PAN and TILT) of a displayed image on the screen based on a relative distance between the reference mark and the current position mark.

5. The camera PTZ control apparatus of claim 1, wherein the PTZ processor controls movement (PAN and TILT) of the monitored area such that the monitored area in which the current position mark is placed is moved to a screen position at which the reference mark is placed, within a predetermined time period.

6. The camera PTZ control apparatus of claim 1, wherein the PTZ processor further comprises a zoom controller configured to calculate and output a zooming magnification value according to a vertical direction formed by the reference mark and the current position mark.

7. The camera PTZ control apparatus of claim 6, wherein the zoom controller calculates and outputs an amount of zooming which is to be processed within a predetermined time period according to a distance between the reference mark and the current position mark.

8. The camera PTZ control apparatus of claim 6, wherein the zoom controller sets the current position mark above or below the reference mark according to a y-coordinate indicated by the operation unit.

9. The camera PTZ control apparatus of claim 3, the UI visualization unit further generates a graphic output signal of a connection line that visualizes a distance between and a direction of the reference mark and the current position mark by connecting the two marks.

10. The camera PTZ control apparatus of claim 1, wherein the PTZ processor sets the reference mark in response to a first user operation and sets the current position mark in response to a second user operation.

11. The camera PTZ control apparatus of claim 10, wherein the first user operation is a click and the second user operation is a drag.

12. The camera PTZ control apparatus of claim 10, wherein the first user operation is a touch with a pressure of a predetermined level or higher or a touch for a predetermined period or longer and the second user operation is a touch-drag which is continuously input after the first user operation.

13. The camera PTZ control apparatus of claim 1, further comprising a display controller configured to receive the graphic output signal from the UI visualization unit and display an overlaying image in which a graphic UI is overlapped on a captured image received from the shooting camera.

* * * * *